March 9, 1971     E. M. YACKO     3,568,354
LUMINESCENT FISHING LURES AND ACCESSORIES
Filed Feb. 7, 1969
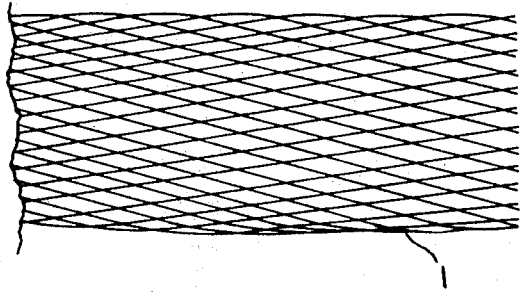
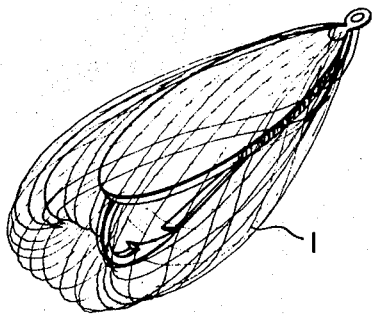
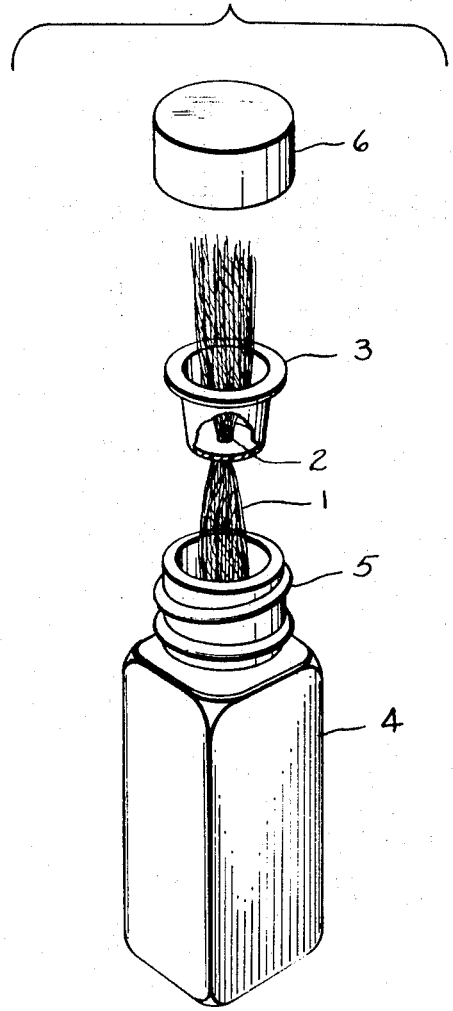
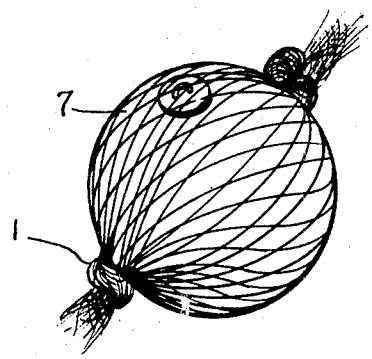
Inventor:
Edward M. Yacko.
by John H Lewis Jr
Nicholas Skovran
Attorney

3,568,354
LUMINESCENT FISHING LURES AND ACCESSORIES

Edward M. Yacko, Bridgeport, Conn., assignor to Remington Arms Company, Inc., Bridgeport, Conn.
Filed Feb. 7, 1969, Ser. No. 797,543
Int. Cl. A01k 85/00
U.S. Cl. 43—17.6      4 Claims

ABSTRACT OF THE DISCLOSURE

This disclosure relates to fishing lures and materials which can be attached to fishing lures to cause them to glow in the dark with the objective of attracting fish. The attracting element is in the form of a polyolefinic plastic film, rope, thread or netting impregnated with an oxyluminescent material which glows after exposure to the oxygen in the air. For an illustrative embodiment, a protective container is provided which maintains a supply of the material out of contact with the air until it is to be used.

BACKGROUND OF THE INVENTION

Field of the invention

This invention relates to improvements in the art of attracting fish to natural or artificial lures and has as its principal object the provision of chemiluminescent material in such a form that it may itself form the sole attracting agent or may be added to other lures in such a way as to increase their fish attracting potential.

Description of the prior art

It has been realized for some time that the chemical substance tetrakis (dimethylamino) ethylene and certain related chemicals are oxyluminescent or capable of emitting visible light while undergoing an oxidation reaction as a result of exposure to oxygen or atmospheric air and this reaction has been utilized in the production of lighting devices for signalling, emergency rescue and other purposes when electrical energy or other power is not readily available.

Devices of these types are shown, for example, in the following patents, each abstracted below:

3,239,406, Coffman and Winberg.—Chemiluminescent adhesive tape with one surface impregnated with oxyluminescent composition protected until ready for use by a removable envelope or strippable overcoat which prevents access of air to the impregnant until opened.

3,350,553, Cline.—Chemiluminescent plastic panel or tube containing porous filler impregnated with oxyluminescent material. Panel or tube closed by valves or caps which are openable to admit air to the composition.

3,360,426, Cline.—Chemiluminescent panel containing an aluminum reflector and porous filler impregnated with oxyluminescent composition. Envelope openable with tear strips to admit atmospheric air.

It has also been known that certain natural fish baits exhibit some degree of luminescence which seems to be a factor in increasing their desirability as baits and attempts have been made to simulate these effects by the use on artificial lures of various luminous paints or impregnants. The luminescent materials employed appear to have been limited to those which glow briefly after exposure to natural or artificial light or ultra violet radiation or those which are continually energized by the presence in the composition of some small content of radioactive material, with the obvious disadvantages of radioactive materials in this radiation conscious era.

Examples of such baits are shown in the following patents: 1,380,876, Warden, radium activated; 1,833,241, Wright, luminous paint, radiation activated or phosphorescent; 2,303,097, Townsend et al., light activated; 2,449,880, Cox, activated by agitation; 2,563,522, Fisher, light activated.

SUMMARY OF THE INVENTION

It has been discovered that the oxyluminescent liquid substance tetrakis (dimethylamino) ethylene in substantially pure form is absorbed readily by certain polyolefin materials of which low density polyethylene is a preferred material. Up to 25% by weight of the oxyluminescent chemical can be absorbed by the preferred polyolefin. The resulting product appears to be a dry plastic and the chemical cannot be wiped off. After exposure to air the impregnated plastic will glow in the dark for a period of several hours and will continue to glow for periods of up to an hour even though immersed in water, the glow being reactivated by each subsequent exposure to air until the chemical has become exhausted. Since the plastic does not absorb or hold water, immersion has no effect on the ability of the material to exhibit oxyluminescence after subsequent exposure to air and the dissolved oxygen present in most good fishing waters helps to maintain the luminescence during periods of immersion.

The preferred plastic can be produced in any form which makes it readily attachable to lures, bobbers, sinkers, etc. Film, rope, threads or netting have been found suitable for use and attachment to any fishing device. It has not been found to be necessary to fabricate any special lure or other device to accommodate the use of the oxyluminescent impregnated plastic material.

A most convenient carrier for the oxyluminescent material is in the form of a plastic netting of low density polyethylene which is extruded as a sleeve of diamond mesh form. Such a material is commercially available as produced by E. I. du Pont de Nemours and Company under the trademark "Vexar" applied to an integrally extruded plastic mesh material. Such netting can be stretched, wrapped, sleeved, tied, hooked, wound or stitched to any lure, bait, plug, streamer, float, bobber, sinker or other fishing device.

To retain the usefulness of the material it must be stored until use under conditions which protect it from oxygen and precautions must be taken during preparation for use to minimize the exposure of any of the material which is not to be used at once. I have found it convenient to store lengths of the impregnated plastic netting in small bottles fitted with a soft plastic plug having a small hole. One end of the netting is pulled through the hole and allowed to protrude slightly into an area which can be sealed off by a plastic screw cap to make a positive seal. To use the material the plastic screw cap is removed, the required amount of netting is pulled through the plug and cut off. During this operation the tightly fitting soft plastic plug protects the netting in the bottle from exposure to air and after replacement of the cap the small amount of air which may be trapped in the bottle is fairly quickly consumed in producing luminescence of that portion of the netting exposed to the air. Since there is some waste of active material each time the cap is removed and replaced, it is desirable to limit the removal of the cap to those occasions on which this is necessary for the removal of fresh netting.

Among the problems which were solved by the present invention were those of providing a carrier for the oxyluminescent material of such form that water immersion would not defeat the purpose and yet providing for sufficient access of the air to the oxyluminescent material to facilitate activation of the material when required. Another significant problem which was solved was that of providing the oxyluminescent material in a form which is not messy to use as by preventing it from wiping off on fingers or clothing during use. This is a significant problem for the oxyluminescent material has a lingering odor which some individuals find quite unpleasant. Although some odor is emitted by the treated netting, this is minimal by comparison with solutions of the oxyluminescent material and any odor or taste apparent on the netting is either positively attractive to fish or at least is not repulsive to fish. Careful tests with otherwise identical rigging establish that lures rendered luminous by the use of the treated netting are highly effective in the attraction of fish.

BRIEF DESCRIPTION OF DRAWING

FIG. 1 is a pictorial view of a short section of plastic netting as preferred for use in my invention;

FIG. 2 is a pictorial view showing a short length of such plastic netting secured to a spoon type casting lure;

FIG. 3 is a view similar to FIG. 2 showing a short length of such plastic netting secured as an overlayer on the head of a streamer type fly;

FIG. 4 is a view similar to FIG. 2 showing a length of such plastic netting secured to a bobber or float; and FIG. 5 is an exploded pictorial view showing a preferred form of package for the plastic netting prepared for use in my invention.

DESCRIPTION OF THE PREFERRED EMBODIMENT

As set forth in the patent to Cline, 3,360,426 granted Dec. 26, 1967, oxyluminescent articles comprising porous substrates impregnated with tetrakis (disubstituted-amino) ethylene oxyluminescent materials enclosed in flexible, translucent plastic envelopes or tubes fitted with means for admitting air have been described. Composite articles (light sources) are highly useful as safety devices in facilitating rescue of personnel lost in isolated places on land or on water. They provide a light which is visible for considerable distances and that can be activated by personnel from aircraft downed at sea or in isolated areas on land or by ships' personnel overboard at sea.

The oxyluminescent materials useful in the light sources of this invention and in the emergency lighting devices above referred to are the tetrakis (disubstituted-amino) ethylenes of the formula

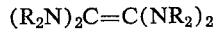

wherein the R's are the same or different and are monovalent alkyl or cycloalkyl of up to 10 carbon atoms, divalent alkylene joined to the other R attached to the same nitrogen to form a 3-5 membered monoaza heterocycle, and divalent alkylene joined to an R attached to a second nitrogen to form a 3-7 membered diaza heterocycle. Specific oxyluminescent compounds of this type include tetrakis (dimethylamino) ethylene, tetrakis (N-pyrrolidinyl) ethylene, 1,1′,3,3′-tetramethyl-Δ$^{2,2'}$-bi(imidazolidine), 1,1′,3,3′-tetraethyl-Δ$^{2,2'}$-bi(imidazolidine), 1,1′,3,3′-tetramethyl-Δ$^{2,2'}$-bi(hexahydropyrimidine), and tetrakis (dimethylaminomethyleneamino) ethylene.

The tetrakis (dimethylamino) ethylene can be prepared by reaction of dimethylamine with chlorotrifluoroethylene as described in J. Am. Chem. Soc., vol. 72, 3646 (1950). The other tetrakis (disubstituted-amino)-ethylene of the above general formula and the bis(disubstituted-amino) hydrocarbyloxymethanes intermediate thereto can be prepared by the process which is described in detail in U.S. Pat. 3,239,519 issued to H. E. Winberg.

These oxyluminescent materials have been used with an inert, nonquenching solvent or carrier, i.e., a material which does not extinguish the oxyluminescence of the tetrakis-(disubstituted-amino) ethylene. Suitable solvents of this type include the hydrocarbons such as n-hexane, decane, Decalin, trisobutylene, cetane, tetra-isobutylene n-octadecane, 1-octadecane, purified kerosenes, white gasolines, or the more viscous hydrocarbons such as mineral oil and the like, or solid or semisolid hydrocarbons such as paraffin wax; nonquenching synthetic oils such as silicone oils, polyalkylene glycols, and diesters; nonquenching, preferably essentially hydrocarbon esters such as ethyl acetate; nonquenching hydrocarbon esters such as tetrahydrofuran, diethyl ether, dimethyl ether, and the like.

For use in my invention tetrakis (dimethylamino) ethylene can be prepared by the reaction of dimethylamine with chlorotrifluoroethylene as described in J. Am. Chem. Soc., vol. 72, 3646 (1950) or it may be prepared as described in U.S. Pat. 3,293,299 to Herbert Boden. The relatively pure product of these processes is in liquid form and capable of exhibiting a high degree of luminescence on exposure to atmospheric air or oxygen. I prefer to use the oxyluminescent material in this relatively pure liquid form which as noted previously herein, can be absorbed into low density polyethylene in proportion of up to 25% by weight. In general, as the percentage of oxyluminescent material is increased, both the intensity and duration of the luminescence is increased and the lower limit of the content of oxyluminescent material is set only by the tolerable lower levels of intensity and duration of luminescence for any particular purpose.

Since tetrakis (dimethylamino) ethylene is oxyluminescent it is necessary to maintain the supply under the protection of an inert atmosphere such as nitrogen until ready for use and to avoid undue exposure to air or oxygen in the process of charging the chemical into the polyethylene netting.

Conveniently the containers of impregnated netting may be prepared for use by following the procedure described below:

Convenient lengths of the plastic netting film 1 as illustrated in FIG. 1, thread or the like may be threaded through a small hole 2 in a plastic stopper 3 and packed into a glass bottle 4 of any convenient size with one end of the plastic material exposed. The plastic stopper 3 is then inserted snugly into the neck 5 of the bottle 4.

The bottle and the netting etc. contained therein is then purged of atmospheric air by introducing a long hollow needle through the hole 2 in the plastic stopper 3 or adjacent to the hole and flowing nitrogen or other inert gas through the needle into the bottom of the bottle 4 until the air in the bottle has been displaced. A practical degree of purging can be accomplished by flowing nitrogen under about 2 p.s.i. pressure through the contents of the bottle for a period of from 15 to 30 seconds although a longer period would result in more complete removal of air contained in the bottle and/or absorbed on the plastic material.

With a hypodermic syringe tetrakis (dimethylamino) ethylene may then be withdrawn from the supply and injected into the bottle through the hole in the plastic stopper in an amount up to 25% by weight of the weight of the plastic material, 8 to 10% by weight provides satisfactory intensity and duration of luminescence for most fishing tackle applications contained therein. A plastic screw cap closure 6 should be promptly applied to seal the bottle until use. FIG. 5 illustrate in an exploded perspective view such a bottle and its contents.

With any practical degree of purging there will be some adsorbed oxygen contained in the bottle and the contents thereof will glow briefly until the oxidation of the oxyluminescent chemical has consumed this oxygen. Prior to use, the charged bottle should be stored at least overnight and preferably for several days to allow the oxyluminescent chemical time to be distributed throughout and uniformly absorbed into the plastic material. This time period could possibly be decreased by the use of agitation to more uniformly distribute the chemical on the surface of the netting but ordinarily plenty of time is available to allow the absorption to proceed naturally. In case there should be any need for early use of the material and in any case to be certain that the chemical has been introduced, inspection under ultraviolet light will readily show by a characteristic fluorescence the presence and distribution of the active chemical.

For use, the screw cap may be removed from the bottle and the required length of mesh pulled through the hole in the plastic plug. The section of mesh may then be cut off, care being taken to insure that it is cut close enough to the plastic plug to insure that loose ends will not interfere with securing a good seal when the screw cap is replaced. This operation should be effected as expeditiously as possible to minimize the opportunity for air to leak into the body of the bottle. Some leakage, however, is almost inevitable and for a brief period the entire contents of the bottle may exhibit oxyluminescence until the oxygen introduced by such leakage has been consumed.

The removed length of mesh will begin to exhibit oxyluminescence almost as soon as it is exposed to air and if left in air will glow for a period of several hours. If immersed continually in water for periods of one-half hour or more, the oxyluminescence will decrease in intensity eventually to a relatively low level sustained by dissolved oxygen in the water but exposure to air as a result of retrieval and casting of a lure restores almost the maximum brilliance of the oxyluminescence.

A length of mesh 1 may be fastened as illustrated in FIGS. 2, 3 and 4, for example, to the lure, bait, plug, bobber, sinker or any other desired piece of fishing tackle by tieing, sleeving, stretching, winding, or knotting in any desired manner and the tackle used in the normal way.

For fishing in deep or murky water the oxyluminescent activity imparts a higher degree of visibility to the lure or bait which seems to be attractive to fish. In fishing at night with surface lures such as popping plugs, the lure is also made visible to the fisherman so that he can better control his casts and the retrieval of his lure. Also for night still fishing, it is a great advantage to attach a length of the oxyluminescent material to a float or bobber 7, as illustrated specifically in FIG. 4, to provide more visibility.

Although the plastic mesh could be saved and reused by reimpregnation with a new charge of the oxyluminescent liquid, this is not particularly practicable in view of the relatively complex problems involved in maintaining a supply of the liquid oxyluminescent material and purging the bottles and plastic mesh to remove the air therefrom before charging and sealing.

This material may also be used to illuminate buoys, anchors, oars, skin diving gear etc. and is very helpful in marking or flagging sunken objects to facilitate retrieval.

As noted, low density polyethylene is the preferred material to use as a carrier for the oxyluminescent material. Other polyolefins will function but they do not have the ability to absorb as much of the oxyluminescent material and the absorption process requires extended periods of time.

Although an illustrative embodiment of my invention has been described above with considerable particularity, it should be understood that I consider my invention to be limited in scope only as set forth in the accompanying claims.

I claim:
1. A fishing lure comprising a body of an artificial substance simulating a natural bait with at least one fish hook secured thereto wherein the improvement comprises a flexible polyolefin plastic netting impregnated with an oxyluminescent chemical and temporarily secured to said body in substantially surrounding nonadherent propinquity thereto so as to clothe the lure in a mantle of artificial light.

2. A fishing lure as defined in claim 1 wherein the oxyluminescent chemical is tetrakis (dimethylamino) ethylene.

3. A fishing lure as defined in claim 2 where the polyolefin plastic material is low density polyethylene.

4. A fishing lure of the type comprising a body of artificial material in simulation of a natural bait; and at least one fish hook secured to said body, the improvement wherein: a flexible low density fibrous polyethylene netting containing tetrakis (dimethylamino) ethylene is secured to said body in substantially surrounding relationship thereto so as to clothe the lure in a mantle of artificial light.

References Cited
UNITED STATES PATENTS

| | | | |
|---|---|---|---|
| 272,317 | 2/1883 | Pflueger | 43—17.6 |
| 564,839 | 7/1896 | Pflueger | 43—17.6X |
| 2,828,571 | 4/1958 | Caplan | 43—41 |
| 3,350,553 | 10/1967 | Cline | 240—2.25 |

ALDRICH F. MEDBERY, Primary Examiner

D. J. LEACH, Assistant Examiner

U.S. Cl. X.R.

43—41; 215—43; 240—2.25; 250—71; 252—188.3, 301.2